United States Patent
Kunomura et al.

(10) Patent No.: US 11,400,817 B2
(45) Date of Patent: Aug. 2, 2022

(54) POWER CONVERSION CONTROLLER

(71) Applicants: Central Japan Railway Company, Nagoya (JP); Toshiba Infrastructure Systems & Solutions Corporation, Kawasaki (JP)

(72) Inventors: Ken Kunomura, Nagoya (JP); Toshimasa Shimizu, Nagoya (JP); Kenji Sato, Nagoya (JP); Hirokazu Kato, Nagoya (JP); Kazuaki Yuuki, Tokorozawa (JP); Toshiyuki Uchida, Kiyose (JP); Masatsugu Morita, Tokyo (JP); Hiroki Miyajima, Saitama (JP); Yukitaka Monden, Kawasaki (JP)

(73) Assignees: Central Japan Railway Company, Nagoya (JP); Toshiba Infrastructure Systems & Solutions Corporation, Kawasaki (JP)

( * ) Notice: Subject to any disclaimer, the term of this patent is extended or adjusted under 35 U.S.C. 154(b) by 368 days.

(21) Appl. No.: 16/752,755

(22) Filed: Jan. 27, 2020

(65) Prior Publication Data

US 2020/0238835 A1 Jul. 30, 2020

(30) Foreign Application Priority Data

Jan. 30, 2019 (JP) .............................. JP2019-014180

(51) Int. Cl.
*B60L 9/24* (2006.01)
*B60L 15/00* (2006.01)
(Continued)

(52) U.S. Cl.
CPC .............. *B60L 9/24* (2013.01); *B60L 15/007* (2013.01); *B60L 50/53* (2019.02);
(Continued)

(58) Field of Classification Search
None
See application file for complete search history.

(56) References Cited

U.S. PATENT DOCUMENTS

| | | | | |
|---|---|---|---|---|
| 2010/0079093 | A1* | 4/2010 | Kitanaka | B60L 3/04 318/400.3 |
| 2015/0207329 | A1* | 7/2015 | Tanaka | H02J 5/00 307/20 |

(Continued)

FOREIGN PATENT DOCUMENTS

| | | |
|---|---|---|
| EP | 0 838 894 A1 | 4/1998 |
| EP | 2 017 936 A1 | 1/2009 |

(Continued)

OTHER PUBLICATIONS

Extended European Search Report dated Jul. 14, 2020 in Patent Application No. 20154306.3, citing documents AO and AP therein, 10 pages.

*Primary Examiner* — Jared Fureman
*Assistant Examiner* — Aqeel H Bukhari
(74) *Attorney, Agent, or Firm* — Oblon, McClelland, Maier & Neustadt, L.L.P.

(57) ABSTRACT

A controller of an embodiment includes a limiter receiving an active current command initial value, limiting a maximum value of the active current command initial value with a predetermined value, and outputting a first value; a circuit to calculate a reactive current command initial value; a calculator to calculate a reactive current command adjustment value; a unit receiving the first value as an input, and calculating a reactive current upper limit value such that a composite value of the first value and the reactive current upper limit value is equal to or smaller than an input current maximum value; and a limiter to output the reactive current command adjustment value or the reactive current upper limit value, whichever is smaller. The predetermined value (Continued)

is a value to set the reactive current upper limit value to a value larger than zero and smaller than the input current maximum value.

3 Claims, 6 Drawing Sheets

(51) Int. Cl.
  *H02M 1/42* (2007.01)
  *H02M 7/48* (2007.01)
  *H02P 27/08* (2006.01)
  *B60L 50/53* (2019.01)

(52) U.S. Cl.
  CPC ............ *H02M 1/4208* (2013.01); *H02M 7/48* (2013.01); *H02P 27/08* (2013.01); *B60L 2200/26* (2013.01); *B60L 2210/40* (2013.01)

(56) References Cited

U.S. PATENT DOCUMENTS

| | | |
|---|---|---|
| 2018/0283351 A1 | 10/2018 | Muszynski et al. |
| 2019/0135117 A1 | 5/2019 | Kunomura et al. |

FOREIGN PATENT DOCUMENTS

| | | | |
|---|---|---|---|
| EP | 2843826 A2 * | 3/2015 | ............ B60L 15/025 |
| GB | 2563556 A | 12/2018 | |
| JP | 2000-156902 A | 6/2000 | |
| JP | 3085406 B2 | 9/2000 | |
| JP | 3186495 B2 | 7/2001 | |
| JP | 2005-73345 A | 3/2005 | |
| JP | 4568111 B2 | 10/2010 | |
| JP | 2017-188990 A | 10/2017 | |
| TW | 201741163 A | 12/2017 | |
| WO | WO 01/17085 A1 | 3/2001 | |

* cited by examiner

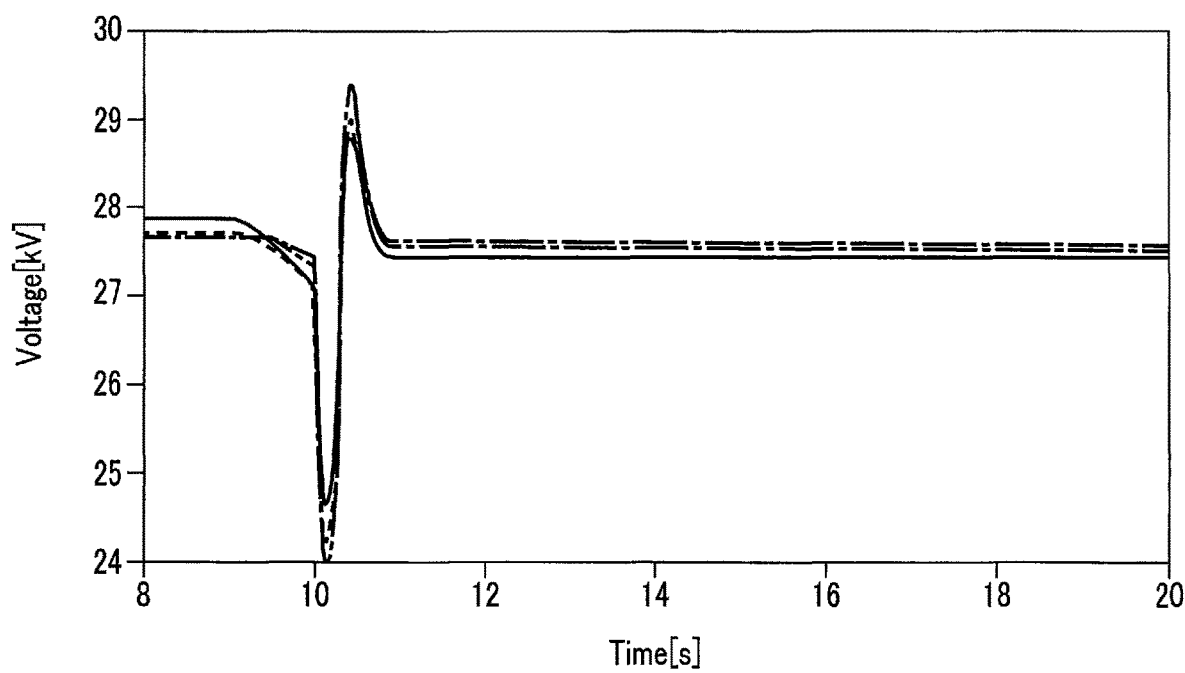
F I G. 4
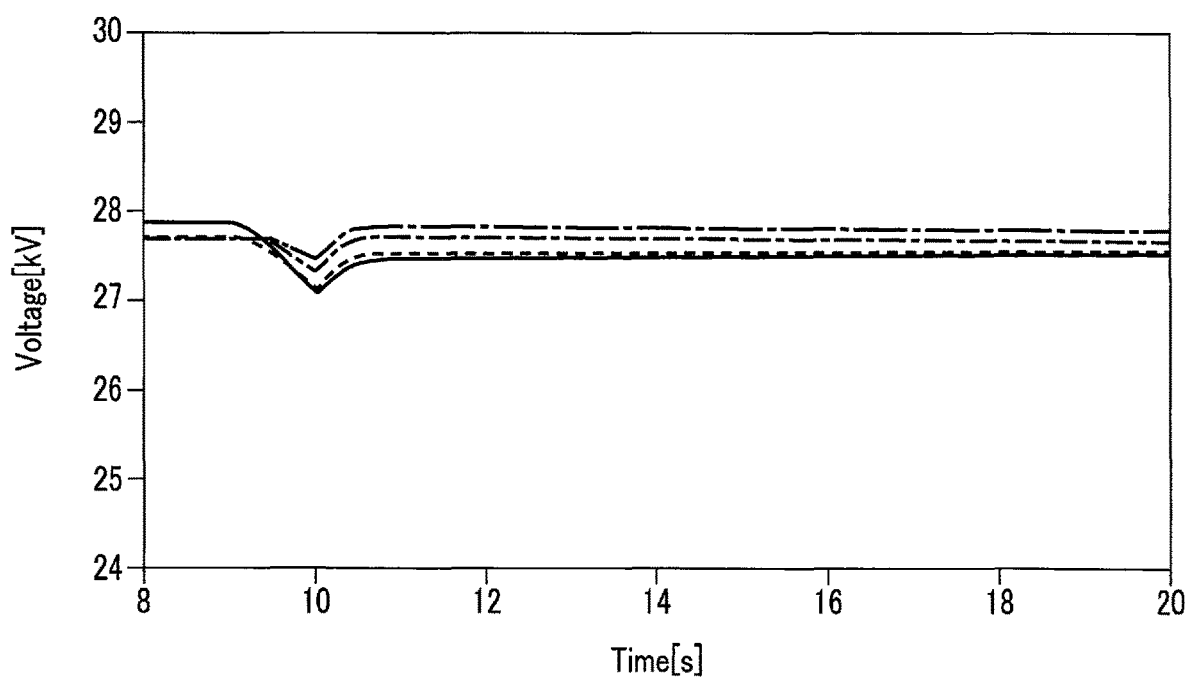
F I G. 5

POWER CONVERSION CONTROLLER

CROSS-REFERENCE TO RELATED APPLICATIONS

This application is based upon and claims the benefit of priority from prior Japanese Patent Application No. 2019-014180, filed Jan. 30, 2019, the entire contents of which are incorporated herein by reference.

FIELD

Embodiments described herein relate generally to a power conversion controller.

BACKGROUND

Trains configured to travel by collecting alternating-current power with a pantograph from an overhead wire are generally equipped with power converters to properly perform power conversion on the alternating-current power collected from the overhead wire and supply the power to traveling motors. As a method for controlling power converters of this type, there is an ordinary method for performing control such that the power factor of the alternating-current power input from the pantograph is 1, that is, such that only active power in the train is collected, from the viewpoint of reduction in weight and size of the devices.

However, when the power converter is controlled such that the power factor is 1 as described above, the overhead wire voltage fluctuates due to influence of the impedance on the power supply side of the feeder circuit supplying alternating-current power to the overhead wire and/or the impedance of the feeder circuit, with consumption of the active power by traveling of the train. For example, in trains designed to consume predetermined active power regardless of the value of the alternating-current voltage input from the overhead wire, such as the current Shinkansen train (Bullet Train), because the current consumed with the train increases with decrease in overhead wire voltage, the overhead wire voltage further decreases due to the influence thereof, and there are cases where predetermined propulsive force cannot be obtained.

To solve the problem, conventional techniques have been proposed to control the power converter such that phase advance reactive power is generated without setting the power factor to 1 in power running in the trains.

However, the techniques described above are techniques of simply adding the phase advance reactive power necessary for maintaining the overhead wire voltage to the active power consumed with the trains and causing the power converters for trains to consume the power. Because the power converters have an upper limit for current the active power is limited by flow of the phase advance reactive current, and consequently there is the possibility that desired propulsive force for trains cannot be acquired. In addition, when a plurality of trains exist in the same feeder circuit, the phase advance reactive power consumptions of the trains may compete and cause a phenomenon of instable overhead wire voltage.

In addition, in the alternating-current feeding system side supplying power to the trains, a power converter suppressing voltage fluctuations of the alternating-current system has been proposed. Specifically, in the proposed technique, the active power and the reactive power of the power converter are autonomously determined on the basis of the system voltage, the determined active power and the reactive power are simultaneously consumed, and thereby voltage fluctuations of the alternating-current feeding system are suppressed.

In the technique described above, the active current command value is determined with the phase advance reactive current command value. Specifically, the technique has the structure in which the supply quantity of the active current is determined depending on the phase advance reactive current quantity. For this reason, the active current necessary for securing propulsive force for the trains cannot be determined as desired. Specifically, in exchange for maintenance of the overhead wire voltage, the active current for the trains themselves cannot be determined as desired, and such a structure may cause any influence on the performance that should be exhibited as electric trains. For this reason, difficulty exists in applying the technique to the power converter for trains.

In addition to the techniques described above, a technique has been proposed to stably maintain the overhead wire voltage at a proper level while securing active power necessary for trains. Specifically, the technique discloses that the reactive current command value is determined depending on the active current command value and in accordance with the magnitude of the active current command value, while the active current command value is generated in accordance with the propulsive force of the motor serving as the load. In addition, the technique discloses that an upper limit is set for the reactive current command value, and an upper limit of a (vector) composite value of the active current command value and the reactive current command value is restricted such that the composite value does not exceed the upper limit for current of the power converter.

Specifically, the technique described above enables determination of the active current command value necessary for propulsion of the trains with priority, without exceeding the upper limit for current of the power converter.

BRIEF DESCRIPTION OF THE DRAWINGS

FIG. 4 is a diagram illustrating an example of a simulation result of a feeder circuit and trains;

FIG. 5 is a diagram illustrating an example of a simulation result of the feeder circuit and the trains;

DETAILED DESCRIPTION

Figure 1:
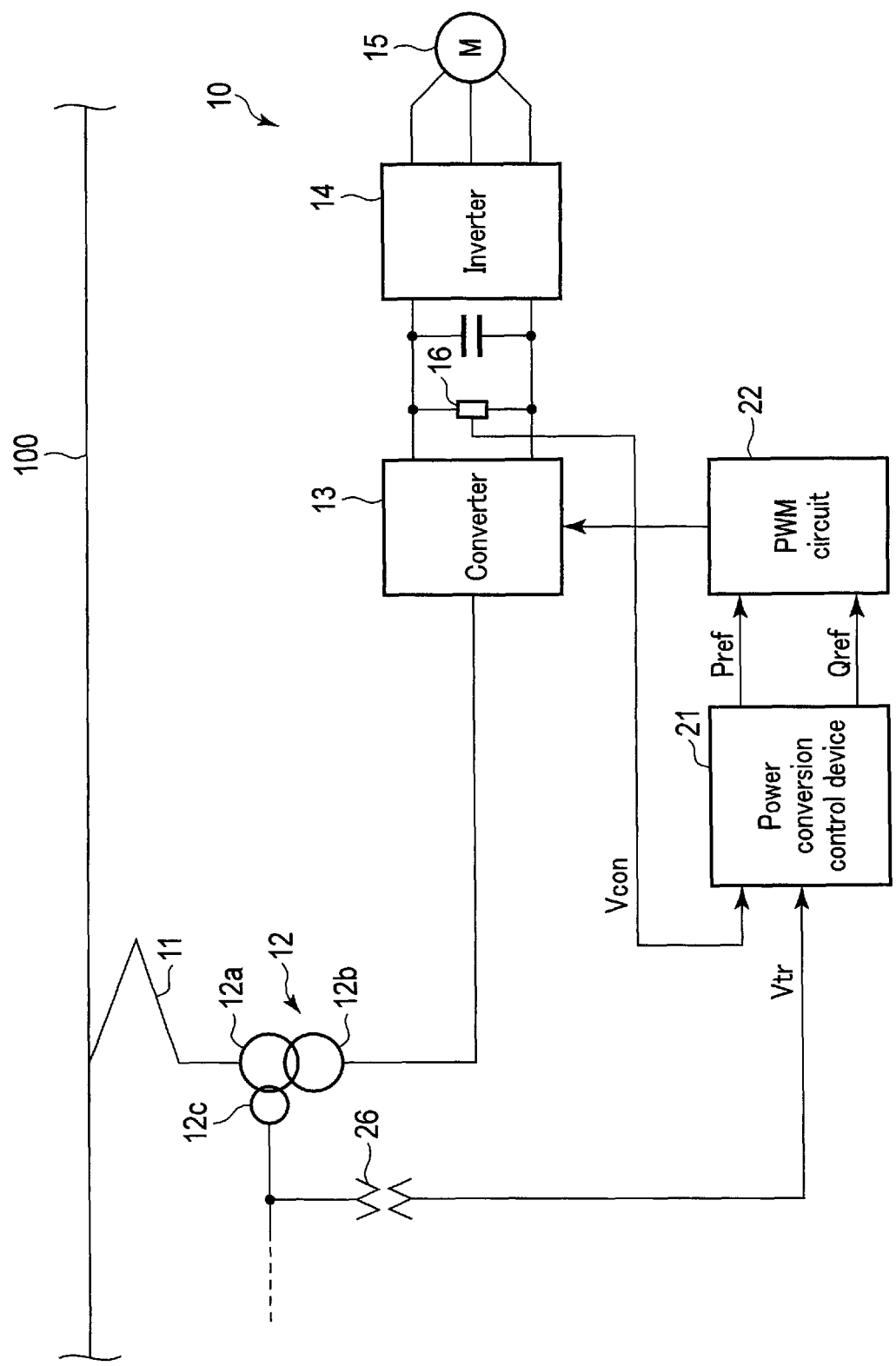
FIG. 1 is a diagram schematically illustrating a configuration example of a train traction circuit system including a power conversion controller according to an embodiment.

For example, when the active current command value increases, because priority is given to maintaining of the electric railcar propulsive force and the composite value of the active current command value and the reactive current command value is limited such that the composite value does not exceed the current maximum value (the upper limit for current) of the power converter, the reactive current command value decreases. The term "current maximum value" herein means a length of a composite vector of the active current command value and the reactive current command value (because the active current is orthogonal to the reactive current). When the active current command value increases steadily or transitionally to a value close to the current maximum value due to fluctuations of the overhead wire voltage and/or the state of the propulsive force command, because the reactive current command value is calculated as a vector reserve force of the current maximum value and the active current command value, the reactive current command value is rapidly limited in accordance with increase of the active current command value and may decrease to a value around zero. This temporally rapid change of the reactive current command value may cause fluctuations of the overhead wire voltage, and cause a phenomenon of instable overhead wire voltage and/or overvoltage and low voltage of the overhead wire voltage. This is supposed to cause stoppage of operations due to malfunction and/or protective operations of the trains or the electric power substation, and impede stable service.

Embodiments of the present invention have been made in consideration of the circumstances described above, and an object of the embodiments is to provide a power conversion controller capable of stably operating the system with high overhead wire voltage.

A power conversion controller according to an embodiment mounted on a train configured to receive alternating-current power from an overhead wire supplied with the alternating-current power, and controlling a power converter performing power conversion on the alternating-current power input from the overhead wire, the power converter configured to consume active current corresponding to an active current command value and phase advance reactive current corresponding to a reactive current command value, on the basis of the active current command value and the reactive current command value input from the power conversion controller, the power conversion controller includes an active current command value generator configured to generate an active current command initial value in accordance with active power to be supplied from the power converter to a load; an active current command limiter receiving the active current command initial value as an input, limiting a maximum value of the active current command initial value with a predetermined active current upper limit value, and outputting the value as the active current command value; an overhead wire voltage detector configured to detect overhead wire voltage serving as voltage input from the overhead wire; an alternating-current voltage control circuit configured to calculate a reactive current command initial value serving as an initial value of the reactive current command value to cause an overhead wire voltage detection value to follow a voltage command value, on the basis of a difference between the voltage command value serving as a target value of the overhead wire voltage and the overhead wire voltage detection value serving as the overhead wire voltage detected with the overhead wire voltage detector; an adjustment value calculator configured to calculate a reactive current command adjustment value serving as a value of percentage corresponding to the active current command value in the reactive current command initial value; an upper limit value setting unit receiving the active current command value as an input, and calculating a reactive current upper limit value such that a composite value of the active current command value and the reactive current upper limit value is equal to or smaller than an input current maximum value serving as a maximum value of an input current of the power converter; and a reactive current command limiter configured to output the reactive current command adjustment value as the reactive current command value when the reactive current command adjustment value is equal to or smaller than the reactive current upper limit value, and output the reactive current upper limit value as the reactive current command value when the reactive current command adjustment value exceeds the reactive current upper limit value. The predetermined active current upper limit value is a value to set the reactive current upper limit value to a value larger than zero and smaller than the input current maximum value of the power converter.

The following is a detailed explanation of a power conversion controller according to an embodiment with reference to drawings.

The power conversion controller according to an embodiment is a power conversion controller mounted on a train configured to receive alternating-current power input from the overhead wire supplied with alternating-current power, and controlling a power converter performing power conversion on alternating-current power input from the overhead wire. The power converter is configured to consume active current corresponding to the active current command value and phase advance reactive current corresponding to the reactive current command value, on the basis of the active current command value and the reactive current command value input from the power conversion controller.

FIG. 1 is a diagram schematically illustrating a configuration example of a train traction circuit system including a power conversion controller according to an embodiment.

A train traction circuit system 10 illustrated in FIG. 1 is mounted on a train configured to collect alternating-current power from an overhead wire 100. The overhead wire 100 is connected with a feeder circuit (not illustrated), and supplied with alternating-current power from the feeder circuit.

The train traction circuit system 10 includes a pantograph 11, a main transformer 12, a converter 13, an inverter 14, a motor 15, a power conversion controller 21, a PWM circuit 22, and an overhead wire voltage detector 26.

The train on which the train traction circuit system 10 is mounted may be a train including an electric railcar, or a train formed of a plurality of electric railcars connected with each other. When the train is formed as a train formed of a plurality of electric railcars connected with each other, the constituent elements forming the train traction circuit system 10 illustrated in FIG. 1 are not necessarily have to be all mounted on the same electric railcar. For example, the power conversion controller 21 may be mounted on an electric railcar different from the electric railcar on which the pantograph 11 is mounted.

The pantograph 11 is a widely-known power collection device to collect alternating-current power from the overhead wire 100. The voltage collected from the overhead wire 100 is, for example, alternating-current voltage of 25 kV in the present embodiment.

The main transformer 12 steps down the alternating-current power collected with the pantograph 11, and supplies the power to the converter 13.

The main transformer 12 includes a primary winding 12a, a secondary winding 12b, and a tertiary winding 12c. The alternating-current power is input to the primary winding 12a from the pantograph 11. The secondary winding 12b steps down the alternating-current voltage from the pantograph 11, and outputs the voltage to the converter 13. The tertiary winding 12c steps down the alternating-current power from the pantograph 11, and supplies the power to an auxiliary circuit system (not illustrated). The voltage value of the alternating-current power (hereinafter also referred to as "secondary output power") output from the secondary winding 12b of the main transformer 12 is, for example, alternating-current voltage of 1000 V, and the voltage value of the alternating-current power (hereinafter also referred to as "tertiary output power") output from the tertiary winding 12c of the main transformer 12 is, for example, alternating-current voltage of 400 V. As a matter of course, each of these voltage values is a mere example.

The converter 13 includes a plurality of switching elements (not illustrated), converts the secondary output power output from the main transformer 12 into direct-current voltage, and outputs the converted voltage. The converter 13 according to the present embodiment is a PWM (Pulse Width Modulation) converter. The converter 13 according to the present embodiment converts, for example, the alternating-current voltage of 1000 V of the secondary output power of the main transformer 12 into a direct-current voltage of 3000 V, and outputs the converted voltage. Each of these voltage values is also a mere example.

The inverter 14 includes a plurality of switching elements (not illustrated), converts the direct-current power output from the converter 13 into three-phase alternating-current power, and outputs the converted power to the motor 15. The inverter 14 according to the present embodiment is a VVVF (Variable Voltage Variable Frequency) inverter.

The motor 15 is a three-phase induction motor in the present embodiment. The motor 15 is rotated and driven by supply of the three-phase alternating-current power. When the motor 15 is driven and rotated, the rotation driving force is transmitted to wheels (not illustrated), and the train travels in this manner.

The overhead wire voltage detector 26 is provided to detect the value of the voltage (overhead wire voltage) input from the overhead wire 100 with the pantograph 11. The overhead wire voltage detector 26 outputs a voltage corresponding to the voltage value of the tertiary output power output from the tertiary winding 12c of the main transformer 12, that is, an overhead wire voltage detection value Vtr indicating the magnitude of the overhead wire voltage to the power conversion controller 21.

The power conversion controller 21 according to the present embodiment deals with each of values used for various calculations described later as values of the pu (per unit) system. For this reason, the overhead wire voltage detector 26 is configured to output a value standardized on the basis of the overhead wire voltage detection value Vtr compliant with the rated value of the overhead wire voltage, that is, the value of the pu system, as the overhead wire voltage detection value Vtr. The overhead wire voltage detection value Vtr output from the overhead wire voltage detector 26 is not always the value of the pu system, but the overhead wire voltage detection value Vtr may be converted into a value of the pu system in the power conversion controller 21.

A converter voltage detector 16 detecting the output voltage from the converter 13 is provided between the converter 13 and the inverter 14. The converter voltage detector 16 outputs a converter output voltage detection value Vcon indicating the value of the output voltage from the converter 13 to the power conversion controller 21. The converter voltage detector 16 is configured to output a value standardized for the rated value of the output voltage of the converter, that is, a value of the pu system, as the converter output voltage detection value Vcon. As another example, the converter output voltage detection value Vcon output from the converter voltage detector 16 is not always a value of the pu system, but the converter output voltage detection value Vcon may be converted into a value of the pu system in the power conversion controller 21.

Using the overhead wire voltage detection value Vtr detected with the overhead wire voltage detector 26 and the converter output voltage detection value Vcon detected with the converter voltage detector 16, the power conversion controller 21 calculates an active current command value Pref indicating an active current to be input to the converter 13 (that is, to be consumed with the converter 13) and a reactive current command value Qref indicating the phase advance reactive current to be consumed with the converter 13, and outputs the values to the PWM circuit 22.

The PWM circuit 22 controls the converter 13 such that the active current corresponding to the active current command value Pref and the phase advance reactive current corresponding to the reactive current command value Qref are input to the converter 13 (that is, such that the active current and the phase advance reactive current are consumed with the converter 13), on the basis of the active current command value Pref and the reactive current command value Qref input from the power conversion controller 21.

Specifically, by individually controlling the timing of turning on and off of the switching elements included in the converter 13, the converter 13 is caused to consume the active current and the phase advance reactive current. The active current command value Pref is a parameter to determine the active current to be input to the converter 13, and the reactive current command value Qref is a parameter to determine the phase advance reactive current to be input to the converter 13.

(2) Configuration of Power Conversion Controller

The following is an explanation of the configuration of the power conversion controller 21 according to the present embodiment with reference to drawings.

Figure 2:
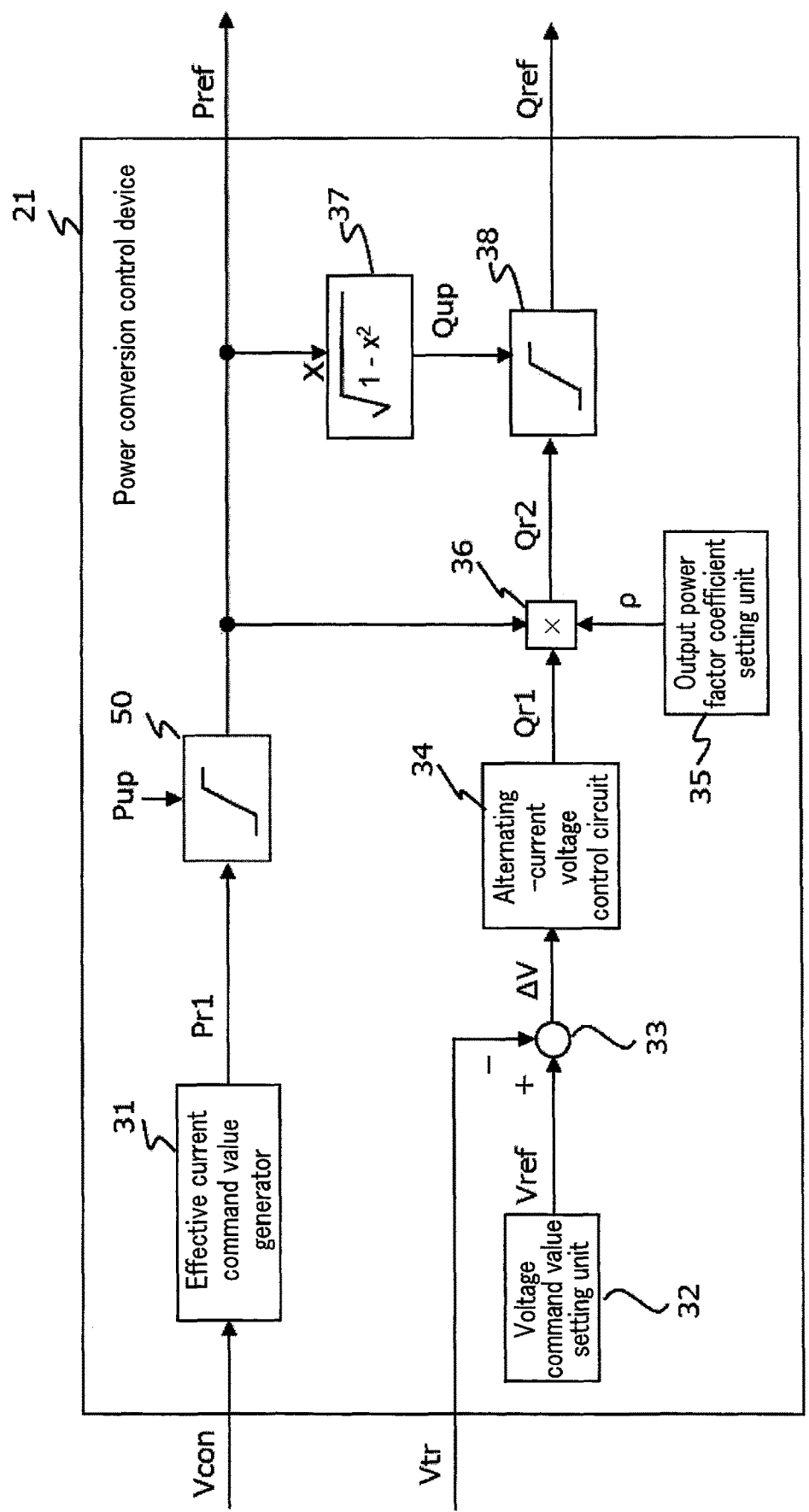
FIG. 2 is a block diagram for explaining a configuration example of a power conversion controller according to a first embodiment.

FIG. 2 is a block diagram for explaining a configuration example of the power conversion controller according to an embodiment. The power conversion controller 21 includes an active current command value generator 31, a voltage command value setting unit 32, an adder 33, an alternating-current voltage control circuit 34, an output power factor coefficient setting unit 35, a multiplier (adjustment value calculator) 36, an upper limit value setting unit 37, a limiter circuit (reactive current command limiter) 38, and a limiter circuit (active current command limiter) 50.

The functions achieved with the power conversion controller 21 illustrated in FIG. 2 may be achieved by, for example, executing a predetermined control program with a computer, or part or all of the functions may be achieved using hardware obtained by combining logic circuits and/or analog circuits.

The active current command value generator 31 generates an active current command initial value Pr1 [pu] corresponding to the active power necessary for the train, that is, the active power to be supplied from the converter 13 to the load. The active current command initial value Pr1 [pu] dealt with herein is a value standardized on the basis of a rated input current value serving as a rated value of the input current provided in the converter 13.

The load of the converter 13 means the whole load in which the power output from the converter 13 is consumed. Accordingly, the load of the converter 13 at least includes the inverter 14 and the motor 15.

In the following explanation, the expression of the unit symbol [pu] will be omitted for the active current command initial value Pr1 [pu]. In addition, although the active current command value Pref, a voltage command value Vref, a voltage difference ΔV, a reactive current command initial value Qr1, a reactive current command adjustment value Qr2, an upper limit value Qup, and the reactive current command value Qref described later are dealt with in the pu system, the expression of the unit symbol [pu] will be omitted also for these values.

The active current command value generator 31 generates an active current command initial value Pr1 such that the necessary active power is supplied to the load. The active current command initial value Pr1 is a value to input active current necessary for supplying the active power to the converter 13.

The active power required with the train fluctuates according to the operation state of the load. The operation state of the load can be indirectly recognized with the value of the output voltage from the converter 13. When the active power to be supplied to the load increases, the output voltage of the converter 13 decreases. Conversely, when the active power to be supplied decreases, the output voltage of the converter 13 increases. For this reason, in the present embodiment, the active current command value generator 31 generates an active current command initial value Pr1 by performing predetermined voltage fixing control to maintain the output voltage of the converter 13 at a fixed related value on the basis of the converter output voltage detection value Vcon input from the converter voltage detector 16. Specifically, the active current command value generator 31 generates the active current command initial value P0 such that the active current command initial value Pr1 increases as the converter output voltage detection value Vcon decreases.

The limiter circuit 50 limits the maximum value of the active current command initial value Pr1 input from the active current command value generator 31, and outputs the value as a final active current command value Pref. Specifically, the limiter circuit 50 is configured to output the active current command initial value Pr1 as the active current command value Pref when the input active current command initial value Pr1 is equal to or smaller than the upper limit value Pup, and outputs the upper limit value Pup as the active current command value Pref when the active current command initial value Pr1 exceeds the upper limit value Pup.

The upper limit value Pup used as the maximum value in the limiter circuit 50 may be a value input from the outside of the power conversion controller 21, or a value that can be set in the power conversion controller 21. When the current rated value of the converter 13 is 1 pu, the upper limit value Pup is set to a significant value smaller than 1. In the present embodiment, the value of the upper limit value Pup is set to, for example, 0.95 or less.

By setting the active current upper limit value Pup, the reactive current upper limit value described later is set to a value larger than 0 and smaller than the input current maximum value of the converter 13.

The voltage command value setting unit 32 sets a voltage command value Vref [pu] as the target value for the overhead wire voltage detection value Vtr. It may be properly determined what specific value is set as the voltage command value Vref. For example, the overhead wire voltage detection value Vtr at the time when the overhead wire voltage is 28 kV may be set as the voltage command value Vref such that the overhead wire voltage from the overhead wire 100 is maintained at 28 kV.

The adder 33 calculates a voltage difference ΔV serving as a difference between the voltage command value Vref set in the voltage command value setting unit 32 and the overhead wire voltage detection value Vtr.

The alternating-current voltage control circuit 34 is formed of, for example, a proportional integral circuit or a primary delay circuit or the like, and calculates the reactive current command value such that the voltage difference ΔV becomes zero, that is, such that the overhead wire voltage detection value Vtr follows the voltage command value Vref. Although not illustrated, the reactive current command value is limited to a range between 0 [pu] to 1 [pu]. The reactive current command value calculated herein is not a value output as a final value to the PWM circuit 22, but a value calculated in consideration of reducing the voltage difference ΔV to zero. For this reason, the reactive current command value is referred to as "reactive current command initial value Qr1" to be distinguished from the final calculated reactive current command value Qref.

The multiplier 36 multiplies the active current command value Pref output from the limiter circuit 50, the reactive current command initial value Qr1 calculated with the alternating-current voltage control circuit 34, and the output power factor coefficient ρ set with the output power factor coefficient setting unit 35. The multiplication calculates a reactive current command adjustment value Qr2 obtained by adjusting the reactive current command initial value Qr1 with the active current command value Pref and the output power factor coefficient ρ.

In the multiplication with the multiplier 36, multiplication of the reactive current command initial value Qr1 and the active current command value Pref is multiplication to adjust the reactive current command initial value Qr1 calculated with the alternating-current voltage control circuit 34 to a value of a percentage corresponding to active current command value Pref. For example, when the active current command value Pref is 0.8 [pu], the reactive current command initial value Qr1 is adjusted to a value of 80% by multiplication with the active current command value Pref.

By contrast, in multiplication with the multiplier 36, multiplication of the reactive current command initial value Qr1 and the output power factor coefficient ρ is multiplication to adjust the reactive current command initial value Qr1 calculated with the alternating-current voltage control circuit 34 in accordance with the output power factor setting value cos φ. Specifically, it is multiplication to adjust the reactive current command initial value Qr1 such that the power with the power factor of the output power factor setting value cos φ or more is input to the converter 13 and consumed with the converter 13. The symbol "φ" indicates a power factor angle that is set in advance in accordance with the active power to be consumed with the converter 13, and the setting thereof can be properly changed.

The output power factor coefficient ρ is expressed as "ρ=tan φ" using the power factor angle φ, that is, with the tangent of the power factor angle φ. Specifically, the output power factor coefficient ρ decreases as the power factor angle φ decreases and the output power factor setting value cos φ approaches 1. Conversely, the output power factor coefficient ρ increases as the power factor angle φ increases and the output power factor setting value cos φ approaches 0. For this reason, by multiplying the reactive current command initial value Qr1 by the output power factor coefficient ρ with the multiplier 36, the reactive current command initial value Qr1 is adjusted to a smaller value as the output power factor setting value cos φ becomes closer to 1. Conversely, the reactive current command initial value Qr1 is adjusted to a larger value as the output power factor setting value cos φ becomes closer to 0.

Using tan φ as the output power factor coefficient ρ is a mere example, and any other value capable of properly adjusting the reactive current command initial value Qr1 in accordance with the output power factor setting value cos φ may be used as the output power factor coefficient ρ. Specifically, the output power factor setting value cos φ may be properly set to a value between 0 to 1 in accordance with the output power factor setting value cos φ.

The main purpose of adjusting the reactive current command initial value Qr1 with the active current command value Pref by multiplication with the multiplier 36 is to adjust the quantity of the phase advance reactive current consumed with the converter 13 to a proper quantity suitable for the magnitude of the active power necessary for the train. By the adjustment, the phase advance reactive current is adjusted to a larger value in accordance with increase in necessary active power, and the phase advance reactive current is adjusted to a smaller value in accordance with decrease in necessary active power. In this manner, for example, when a plurality of trains including the train exist in the same feeding section and each of the trains includes the power conversion controller 21 according to the present embodiment, the phase advance reactive current is properly adjusted in each of the trains. Consequently, this structure suppresses competition of phase advance reactive current consumption between the trains, and stabilizes the overhead wire voltage.

By contrast, the main purpose of adjusting the reactive current command initial value Qr1 with the output power factor coefficient ρ by multiplication with the multiplier 36 is to secure the power factor equal to or larger than the output power factor setting value cos φ, regardless of the value of the active current.

The limiter circuit 38 limits the maximum value of the reactive current command adjustment value Qr2 calculated with the multiplier 36, and outputs the value as the final reactive current command value Qref. Specifically, when the reactive current command adjustment value Qr2 is equal to or smaller than the upper limit value Qup, the limiter circuit 38 outputs the reactive current command adjustment value Qr2 as the reactive current command value Qref without any processing. By contrast, when the reactive current command adjustment value Qr2 exceeds the upper limit value Qup, the limiter circuit 38 outputs the upper limit value Qup as the reactive current command value Qref. The upper limit value Qup used in the limiter circuit 38 is set with the upper limit value setting unit 37.

The upper limit value setting unit 37 sets the upper limit value Qup on the basis of the active current command value Pref such that the upper limit value Qup has a smaller value as the active current command value Pref increases. More specifically, the upper limit value setting unit 37 calculates and sets the upper limit value Qup with the following expression (1).

$$Qup = \sqrt{(1 - Pref^2)} \quad (1)$$

Specifically, priority is given to consume the active current command value Pref output from the limiter circuit 50 with the converter 13 without any processing, to prevent sacrifice of the consumption quantity of the active power. By contrast, the whole current input to the converter 13 is set to a value equal to or smaller than the rated input current value. Specifically, the upper limit value Qup for the reactive current command value Qref is set such that a composite value (specifically, the vector composite value) of the active current command value Pref and the reactive current command value Qref is set to a value equal to or smaller than the rated input current value. For this reason, the phase advance reactive current is limited to a reserve range excluding the active current command value Pref in the rated input current of the converter 13.

With the limiter circuit 38 operating on the basis of the upper limit value Qup, the whole current input to the converter 13 can be suppressed to a value equal to or smaller than the rated input current value. In addition, within the range equal to or smaller than the rated input current value, the active current is consumed with priority, and the phase advance reactive current is applied to the reserve part.

(3) Functions and Effects

In the power conversion controller 21, the reactive current command initial value Qr1 calculated with the alternating-current voltage control circuit 34 is output through proper adjustment or limitation, with respect to the active current command value Qref in the active current command value Pref and the reactive current command value Qref output to the PWM circuit 22. Specifically, the reactive current command initial value Qr1 calculated with the alternating-current voltage control circuit 34 is adjusted to a value suitable for the active current command value Pref with the multiplier 36, and adjusted to a value suitable for the power factor angle φ. Specifically, as the active current command value Pref has a smaller value, the reactive current command initial value Qr1 is adjusted to a smaller value. In addition, as the power factor angle φ has a smaller value (that is, as the output power factor setting value cos φ is closer to 1), the reactive current command initial value Qr1 is adjusted to a smaller value.

By adjusting the reactive current command initial value Qr1 to a value suitable for the active current command value Pref, it is possible to stably maintain the overhead wire voltage input from the overhead wire 100 to a value equal to or larger than the standard value (rated value) thereof, while suppressing competition of phase advance reactive current consumption with other trains existing in the same feeder circuit. This structure suppresses drop of the overhead wire voltage with traveling of the train. Consequently, this structure enables extension of the feeding distance, and omission of installation of the reactive power compensator or a fixed power factor output power converter in the feeding transformer substation, and reduces the total cost for the equipment to run the trains.

In addition, by adjusting the reactive current command initial value Qr1 to a value suitable for the output power factor setting value cos φ, it is possible to perform control such that the active power is mainly consumed in the power consumed with the converter 13, regardless of the magnitude of the active current command value Pref.

In addition, because the reactive current command adjustment value Qr2 adjusted using the active current command value Pref and the output power factor setting value cos φ in the multiplier 36 is output as the reactive current command value Qref through the limiter circuit 38, the reactive current command value Qref output as the final value is limited to the upper limit value Qup at the maximum. Besides, the upper limit value Qup is calculated with the expression (1) described above. This structure achieves control with priority given to consumption of the active power within the range of the rated input current value of the converter 13. This structure enables both stable maintaining of the overhead wire voltage at a proper level and securement of active power necessary for the train, while the rated capacity of the converter 13 is maintained at a value equal to that of a conventional converter only consuming the active power (that is, a converter controlled to have a power factor of 1).

For example, control with priority given to consumption of the active power achieves acquisition of predetermined propulsive force without increasing the rated capacity of the converter 13. In addition, for example, even when a plurality of trains exist in the same feeder circuit, each of the trains autonomously determines a share of the consumption quantity of the phase advance reactive power, and stable control of the overhead wire voltage is achieved.

However, qualitatively, to secure reserve force to cause the reactive current to flow without limiting the active current maximum value, it is necessary to increase the rated capacity of the converter 13 and secure the capacity for phase advance reactive power consumption in advance. As a result, the size and the weight of the converter 13 increases, and it may become difficult to secure the mount space of the converter 13. Even if the space to mount the converter 13 can be secured, increase in weight of the converter 13 causes increase in power consumption of the train.

For this reason, in the power conversion controller 21 according to the present embodiment, the maximum value of the active current command value Pref is limited with the limiter circuit 50, in the active current command value Pref and the reactive current command value Qref output to the PWM circuit 22. Specifically, in the present embodiment, the active current command value Pref serves as a value to reduce the active current for the rated current of the converter 13.

Figure 3:
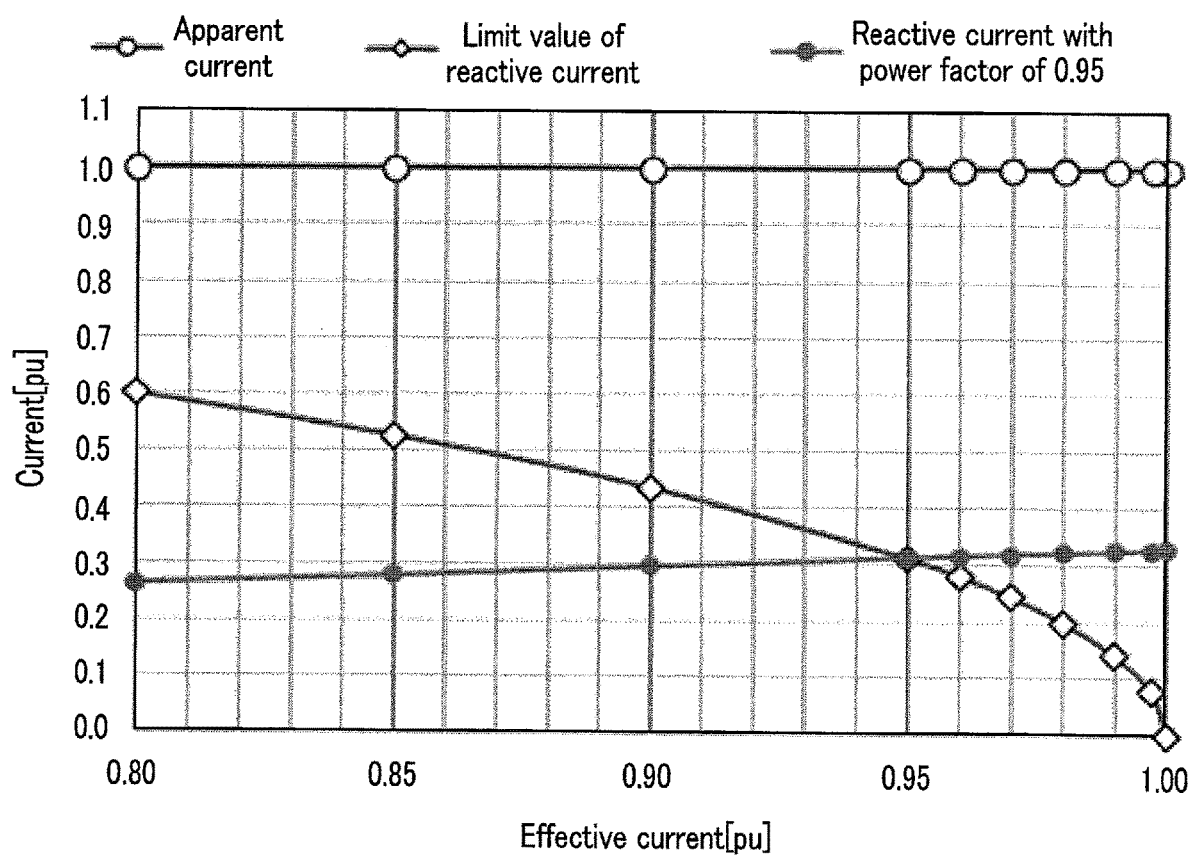
FIG. 3 is a diagram for explaining an effect of the power conversion controller according to an embodiment.

FIG. 3 is a diagram for explaining the effect of the power conversion controller according to an embodiment.

In the example, the apparent current maximum value (current rating of the converter 13) is 1 [pu]. In addition, with the active current used as a parameter, the reactive current limit value is calculated such that the apparent current has the maximum value thereof. In this state, the apparent current formed by vector composition of the active current and the reactive current limit value is maintained at 1 [pu]. In addition, FIG. 3 illustrates the reactive current to be caused to flow in accordance with the active current when the system is operated with the leading power factor of 0.95.

In the example illustrated in FIG. 3, when the active current is caused to flow up to 1 [pu], the reactive current limit value rapidly decreases as the active current approaches 1 [pu]. For example, when the active current is smaller than 0.95 [pu], limitation of the limit value has no influence on the reactive current. At the point in time when the active current becomes 0.95 [pu], the reactive current agrees with the reactive current limit value. The reactive current value when the active current is 0.95 [pu] is 0.31 [pu]. As the active current exceeds 0.95 [pu] and increases to 1.00 [pu], the active current is rapidly limited from 0.31 [pu] to 0.00 [pu]. In addition, rapid change in reactive current for change in active current tends to markedly occur when the active power becomes close to 1 [pu].

When the reactive current is rapidly limited as described above, because the reactive current having a large influence on the overhead wire voltage rapidly decreases, the overhead wire voltage rapidly fluctuates, and the fluctuations further have an influence on control of the electric railcars. As a result, this structure may impede operations of the ground and on-board devices due to instable overhead wire voltage and/or overvoltage and low voltage caused by the instable overhead wire voltage.

In the power conversion controller 21 according to the present embodiment, the maximum value of the active current is limited with the limiter circuit 50 for the maximum value of the apparent current. For example, supposing that the maximum value of the apparent current is set to 1 [pu], the maximum value of the active current is limited to 0.95 [pu]. In this manner, by increasing (increasing the current) the capacity of the converter 13 by 0.05 [pu] of the limited active current, it becomes possible to cause the reactive current of 0.31 [pu] to flow. The reactive current of 0.31 [pu] that can be caused to flow has a value much larger than 0.05 pu serving as an increase of the apparent current. Because the reactive current can be caused to flow, this structure solves the fear of instable overhead wire voltage and/or overvoltage and low voltage, and enables stable operation.

FIG. 4 and FIG. 5 are diagrams illustrating an example of a simulation result of the feeder circuit and the trains. Each of FIG. 4 and FIG. 5 illustrates an example of a result of simulation of the effective values of the overhead wire voltage, in a state where six trains exist at different mileages in a certain feeding section, under the conditions in which the six trains simultaneously transition from coasting to the maximum power running at the point in time of 9th second.

FIG. 4 illustrates an example of an analysis result for the train traction circuit system equipped with the power conversion controller including no limiter circuit 50 illustrated in FIG. 2 and the feeder circuit, as a comparison target, Specifically, in the example, the active current increases to a value close to the rated current of the converter, the reactive current is rapidly limited, and consequently the overhead wire voltage greatly fluctuates.

FIG. 5 illustrates an example of an analysis result for the feeder circuit and the train traction circuit system 10 equipped with the power conversion controller including the limiter circuit 50 illustrated in FIG. 2. In this example, the upper limit value Pup of the active current command value of the limiter circuit 50 in FIG. 2 is set to 0.93 [pu]. The simulation result illustrated in FIG. 5 proves that the overhead wire voltage is stabilized because the room for causing the reactive current to flow is left even when the active current increases.

As described above, the power conversion controller 21 according to the present embodiment includes means for setting the maximum value of the active current to a value significantly smaller than the apparent current maximum value, generates the room for causing the active current to flow, and avoids instable overhead wire voltage.

Specifically, the present embodiment solves decrease in overhead wire voltage without increasing the capacity of the converter. In addition, the present embodiment avoids instable overhead wire voltage, and consequently provides a power conversion controller capable of stably operating the system with high overhead wire voltage.

Specifically, this structure secures the room for causing the reactive current to flow by decreasing the maximum value of the active current, and consequently enables stable operation with high overhead wire voltage. This structure reduces the necessary active current, and achieves operation with the apparent current maximum value equal to conventional systems. In other words, the present embodiment acquires the effect of reducing the apparent current by virtue of increase in overhead wire voltage and reduction in active current. This structure equalizes or reduces the apparent current (converter capacity) as a whole, even when the room for causing the reactive current to flow is secured.

The following is a detailed explanation of a power conversion controller according to the second embodiment with reference to drawings.

In the following explanation, the same constituent elements as those in the first embodiment described above will be denoted by the same reference numerals, and an explanation thereof will be omitted.

Figure 6:
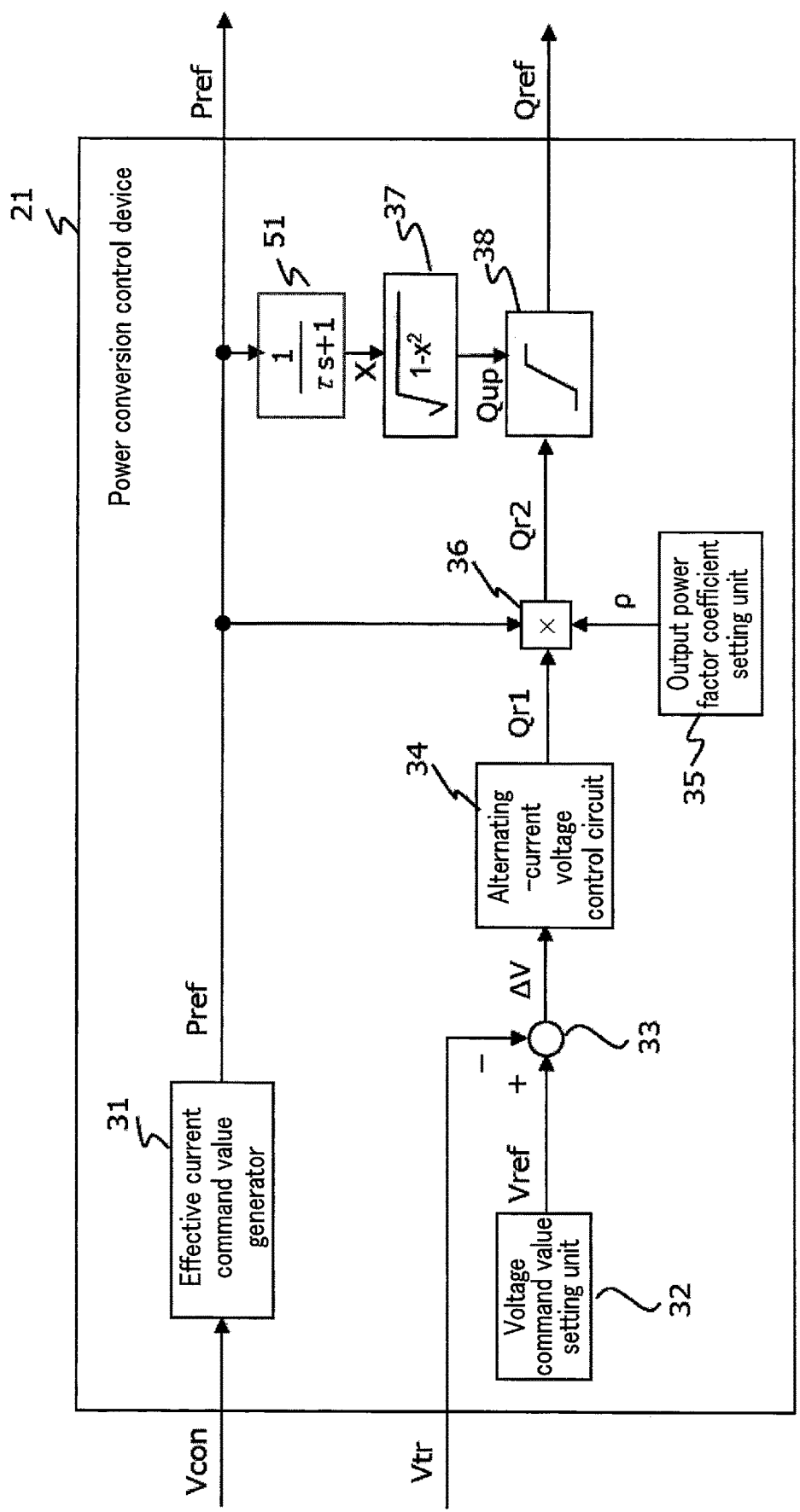
FIG. 6 is a block diagram for explaining a configuration example of a power conversion controller according to a second embodiment.

FIG. 6 is a block diagram for explaining a configuration example of a power conversion controller according to the second embodiment.

A power conversion controller 21 according to the present embodiment has a structure of including a low-pass filter (filter processing unit) 51 and excluding the limiter circuit 50 of the power conversion controller 21 according to the first embodiment described above. Specifically, in the present embodiment, the value output from the active current command value generator 31 is input to the PWM circuit 22 as an active current command value Pref.

The low-pass filter 51 is disposed at the stage before the upper limit value setting unit 37 setting the limit value of the reactive current. Specifically, the active current command value Pref output from the active current command value generator 31 is input to the low-pass filter 51, and subjected to filtering in the low-pass filter 51 to let the bands equal to or lower than the predetermined frequency pass through, and thereafter input to the upper limit value setting unit 37.

The power conversion controller 21 according to the present embodiment is the same as the first embodiment described above other than the point described above.

Specifically, in the present embodiment, the active current value used for setting the upper limit value of the reactive current in the upper limit value setting unit 37 is a value having passed through the low-pass filter 51. For this reason, for example, when the active current rapidly increases and approaches to 1 [pu], the limit value of the reactive current does not rapidly decrease by virtue of the function of the low-pass filter 51. Accordingly, the power conversion controller 21 according to the present embodiment suppresses rapid change of the reactive current, and avoids instable overhead wire voltage.

In the present embodiment, because the power conversion controller 21 suppresses rapid change of the reactive current, a current exceeding the apparent current maximum value may be caused to flow through the converter 13 for a moment. However, the excess decreases with a time constant of the low-pass filter 51, and does not steadily exceed the apparent current maximum value. Generally, increase in size and weight of the device of the converter due to increase in converter capacity occurs because increase in cooling capacity is required. The purpose of including the low-pass filter 51 in the power conversion controller 21 is to stabilize the overhead wire voltage, and the response time constant thereof may be considered as approximately 1 second or less. Even when the current exceeds the apparent current maximum value of the converter 13 in such a short time region, it is unnecessary to consider increasing the cooling capacity of the converter 13, and increase in size and weight of the device of the converter 13 can be avoided.

In addition, in the example illustrated in FIG. 6, the low-pass filter 51 is disposed at the input of the reactive current to the upper limit value setting unit 37, but the structure is not limited thereto. The same effect as that of the present embodiment can be obtained also with a structure of disposing the low-pass filter 51 in any path calculating the reactive current command.

Specifically, the present embodiment also provides a power conversion controller capable of stably operating the system with high overhead wire voltage, in the same manner as the first embodiment described above.

The following is a detailed explanation of a power conversion controller according to a third embodiment with reference to drawings.

In the following explanation, the same constituent elements as those in the first and the second embodiments described above will be denoted by the same reference numerals, and an explanation thereof will be omitted.

Figure 7:
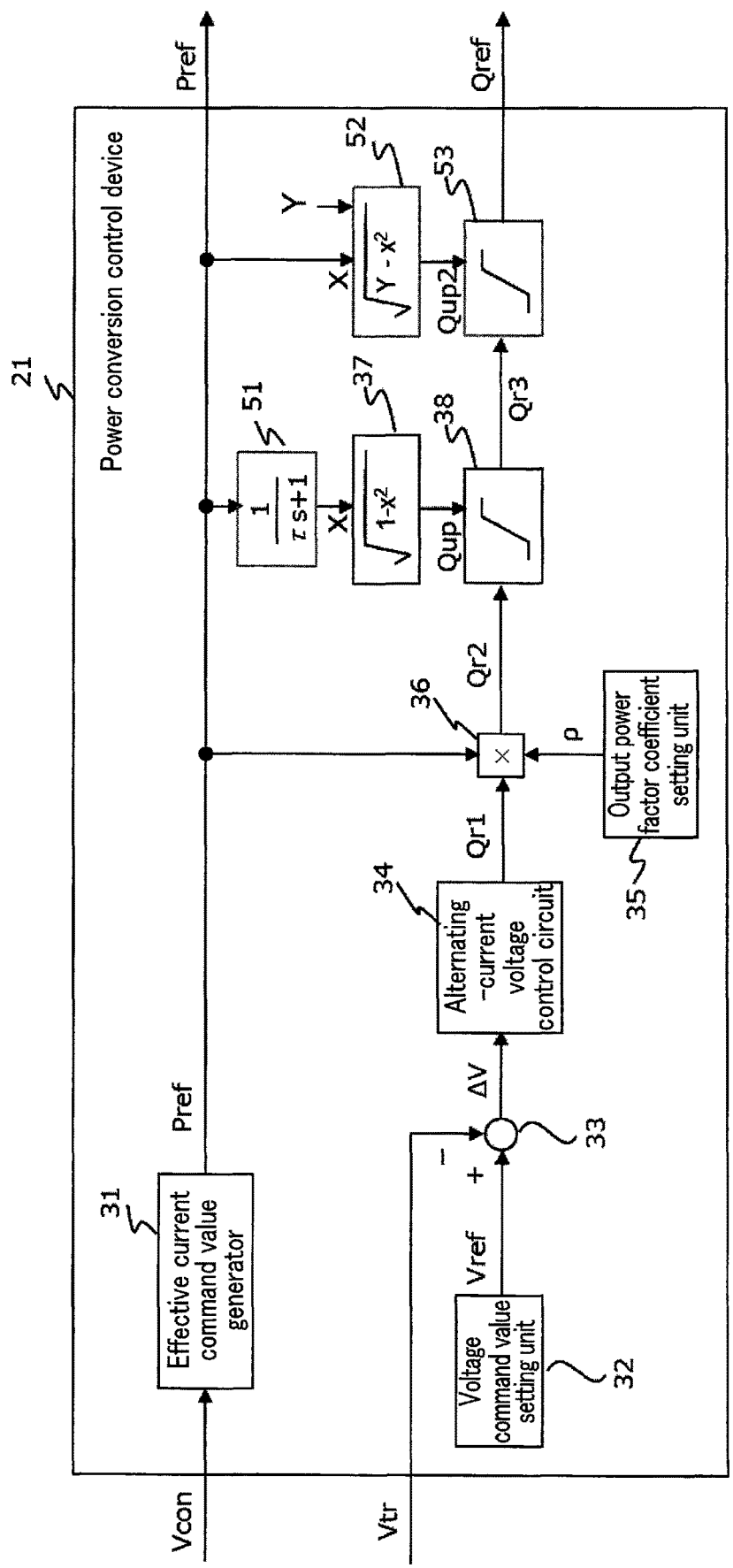
FIG. 7 is a block diagram for explaining a configuration example of a power conversion controller according to a third embodiment.

FIG. 7 is a block diagram for explaining a configuration example of a power conversion controller according to the third embodiment.

A power conversion controller 21 according to the present embodiment has a structure further including an upper limit setting unit (second upper limit value setting unit) 52 and a limiter circuit (second reactive current command limiter) 53 in the power conversion controller 21 according to the second embodiment described above.

The upper limit setting unit 52 receives the active current command value Pref and the limit setting value Y [pu] as inputs, and limits the maximum value of the reactive current command value Qref. The limit setting value Y is a value indicating the breaking current limit (short-time input current maximum value) of the power conversion controller 21, and set to exceed 1 [pu]. The upper limit setting unit 52 calculates the upper limit value Qup2 as in the following expression (2), with the active current command value Pref serving as X.

$$Qup2=\sqrt{(Y-X^2)} \qquad (2)$$

The limiter circuit 53 is disposed at the stage after the limiter circuit 38. In the present embodiment, the value output from the limiter circuit 38 is used as a first reactive current command value Qr3, and input to the limiter circuit 53.

The first reactive current command value Qr3 output from the limiter circuit 38 and the upper limit value Qup2 are input to the limiter circuit 53. The limiter circuit 53 limits the maximum value of the first reactive current command value Qr3 in accordance with the upper limit value Qup2, and outputs the value as the reactive current command value (second reactive current command value) Qref. Specifically, the limiter circuit 53 is configured to output the first reactive current command value Qr3 as the reactive current command value Qref when the input first reactive current command value Qr3 is equal to or smaller than the upper limit value Qup2, and output the upper limit value Qup2 as the reactive current command value Qref when the first reactive current command value Qr3 exceeds the upper limit value Qup2.

As explained in the second embodiment described above, according to the power conversion controller 21 according to the second embodiment, a current exceeding 1 [pu] serving as the apparent current maximum value (converter rated current) may flow through the converter 13 for a moment. As described above, in the power conversion controller 21 according to the second embodiment, even when a current exceeding the converter rated current flows through the converter 13, such a flow is momentary and causes no necessity for increasing the cooling capacity. By contrast, when the apparent current value exceeds the breaking current (maximum value of the short-time input current) of the converter 13, the operation of the converter 13 may stop, and consequently the electric railcars may be stopped.

For this reason, the present embodiment avoids excess of the value of the apparent current flowing through the converter 13 over the breaking current limit value. Specifically, the present embodiment includes second reactive current limit means (limiter circuit 53) operating effectively even for a moment. The limit setting Y [pu] used in the limiter circuit 53 is a value indicating the breaking current limit of the power conversion unit, and set to exceed 1 [pu]. Accordingly, by outputting the reactive current command value Qref through the limiter circuit 53, the maximum apparent current becomes Y [pu] even for a moment, and the apparent current is prevented from exceeding the breaking current limit.

As described above, the present embodiment guarantees that a current that can be allowed both momentarily (viewpoint of the breaking capacity) and continuously (viewpoint of cooling) flows through the converter 13. This structure achieves a train traction circuit system capable of suppressing decrease in overhead wire voltage while stably maintaining the overhead wire voltage, without causing increase in size or weight of the converter 13.

Specifically, the present embodiment provides a power conversion controller capable of stably operating the system with high overhead wire voltage, in the same manner as the first embodiment described above.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A power conversion controller mounted on a train configured to receive alternating-current power from an overhead wire supplied with the alternating-current power, and controlling a power converter performing power conversion on the alternating-current power input from the overhead wire, the power converter configured to consume active current corresponding to an active current command value and phase advance reactive current corresponding to a reactive current command value, on the basis of the active current command value and the reactive current command value input from the power conversion controller, the power conversion controller comprising:
    an active current command value generator configured to generate an active current command initial value in accordance with active power to be supplied from the power converter to a load;
    an active current command limiter receiving the active current command initial value as an input, limiting a maximum value of the active current command initial value with a predetermined active current upper limit value, and outputting the value as the active current command value;
    an overhead wire voltage detector configured to detect overhead wire voltage serving as voltage input from the overhead wire;
    an alternating-current voltage control circuit configured to calculate a reactive current command initial value serving as an initial value of the reactive current command value to cause an overhead wire voltage detection value to follow a voltage command value, on the basis of a difference between the voltage command value serving as a target value of the overhead wire voltage and the overhead wire voltage detection value serving as the overhead wire voltage detected with the overhead wire voltage detector;
    an adjustment value calculator configured to calculate a reactive current command adjustment value which is a value of percentage corresponding to the active current command value in the reactive current command initial value;
    an upper limit value setting unit receiving the active current command value as an input, and calculating a reactive current upper limit value such that a composite value of the active current command value and the reactive current upper limit value is equal to or smaller than an input current maximum value serving as a maximum value of an input current of the power converter; and
    a reactive current command limiter configured to output the reactive current command adjustment value as the reactive current command value when the reactive current command adjustment value is equal to or smaller than the reactive current upper limit value, and output the reactive current upper limit value as the reactive current command value when the reactive current command adjustment value exceeds the reactive current upper limit value, wherein
    the predetermined active current upper limit value is a value to set the reactive current upper limit value to a value larger than zero and smaller than the input current maximum value of the power converter.

2. A power conversion controller mounted on a train configured to receive alternating-current power from an overhead wire supplied with the alternating-current power, and controlling a power converter performing power conversion on the alternating-current power input from the overhead wire, the power converter configured to consume active current corresponding to an active current command value and phase advance reactive current corresponding to a reactive current command value, on the basis of the active current command value and the reactive current command value input from the power conversion controller, the power conversion controller comprising:
    an active current command value generator configured to generate the active current command value in accordance with active power to be supplied from the power converter to a load;
    an overhead wire voltage detector configured to detect overhead wire voltage serving as voltage input from the overhead wire;
    an alternating-current voltage control circuit configured to calculate a reactive current command initial value serving as an initial value of the reactive current command value to cause an overhead wire voltage detection value to follow a voltage command value, on the basis of a difference between the voltage command value serving as a target value of the overhead wire voltage and the overhead wire voltage detection value serving as the overhead wire voltage detected with the overhead wire voltage detector;
    an adjustment value calculator configured to calculate a reactive current command adjustment value which is a value of percentage corresponding to the active current command value in the reactive current command initial value;
    a filter processing unit receiving the active current command value as an input, and letting a low-band frequency pass through;
    an upper limit value setting unit receiving the active current command value output from the filter processing unit as an input, and calculating a reactive current upper limit value such that a composite value of the active current command value and the reactive current upper limit value is equal to or smaller than an input current maximum value serving as a maximum value of an input current of the power converter; and a reactive current command limiter configured to output the reactive current command adjustment value as the reactive current command value when the reactive current command adjustment value is equal to or smaller than the reactive current upper limit value, and output the reactive current upper limit value as the reactive current command value when the reactive current command adjustment value exceeds the reactive current upper limit value.

3. The power conversion controller according to claim 2, further comprising:

a second upper limit value setting unit calculating a second reactive current upper limit value such that a composite value of the active current command value and the second reactive current upper limit value is equal to or smaller than a short-time input current maximum value serving as a maximum value of a short-time input current of the power converter; and a second reactive current command limiter limiting a maximum value of the reactive current command value in accordance with the second reactive current upper limit value.

\* \* \* \* \*